(12) United States Patent
Biddlecom (10) Patent No.: US 9,359,091 B2
(45) Date of Patent: Jun. 7, 2016

(54) SYSTEM AND METHOD OF PROVIDING ARTIFICIAL GRAVITY

(71) Applicant: Symmetry Systems LLC, Boulder, CO (US)

(72) Inventor: Charles A. Biddlecom, Boulder, CO (US)

(73) Assignee: Symmetry Systems LLC, Boulder, CO (US)

( * ) Notice: Subject to any disclaimer, the term of this patent is extended or adjusted under 35 U.S.C. 154(b) by 346 days.

(21) Appl. No.: 14/277,183

(22) Filed: May 14, 2014

(65) Prior Publication Data

US 2015/0329223 A1    Nov. 19, 2015

(51) Int. Cl.
*B64G 1/46* (2006.01)
*B64G 1/12* (2006.01)

(52) U.S. Cl.
CPC ... *B64G 1/46* (2013.01); *B64G 1/12* (2013.01)

(58) Field of Classification Search
CPC .............. B64G 1/12; B64G 1/46; B64G 1/60
See application file for complete search history.

(56) References Cited

U.S. PATENT DOCUMENTS

| | | | | |
|---|---|---|---|---|
| 3,320,815 A * | 5/1967 | Bowles | .................. | B64D 43/02 73/504.17 |
| 3,433,534 A * | 3/1969 | Mercer | ................. | F16F 15/363 301/5.22 |
| 3,799,619 A * | 3/1974 | LaBarber | ............ | B60B 27/0005 301/5.22 |
| 4,643,375 A * | 2/1987 | Allen | ....................... | B64G 1/60 244/171.9 |
| 4,685,800 A * | 8/1987 | Paquet | ...................... | F41G 3/14 340/982 |
| 6,206,328 B1 * | 3/2001 | Taylor | ..................... | B64G 1/12 244/159.6 |
| 6,216,984 B1 * | 4/2001 | Brinsmade | .............. | B64G 1/12 244/159.4 |
| 6,523,782 B2 * | 2/2003 | Barutt | ..................... | B64G 1/60 244/171.9 |
| 2002/0074457 A1 * | 6/2002 | Barutt | ..................... | B64G 1/60 244/171.9 |
| 2010/0263167 A1 * | 10/2010 | Fox | ........................ | F16F 7/104 16/400 |

* cited by examiner

*Primary Examiner* — Joseph W Sanderson
(74) *Attorney, Agent, or Firm* — Locke Lord LLP (57) ABSTRACT

An artificial gravity system and method for a spacecraft including a least one pair of rotatable stages wherein each stage is capable of rotating about at least one structural support in the spacecraft and wherein the rotatable stages in each pair of rotatable stages counter-rotate one another wherein each stage is capable of accommodating a plurality of occupants. The stages may be circular and deployable. The system may also include dynamic balance equipment in each stage consisting of a fluid redistribution design utilizing fluid pumping systems, storage- and reserve-volume tank pairs to redistribute fluid throughout each stage for optimal mass balance, stage- and spacecraft-mounted laser-tracking equipment for redundant speed measurement, drive assembly and a brake motor and wheel assembly, foldable structural support arms capable of reducing the radial space of each stage during takeoff, and an inertial measurement unit capable of detecting overall vehicle rotational rates.

15 Claims, 6 Drawing Sheets

SYSTEM AND METHOD OF PROVIDING ARTIFICIAL GRAVITY

BACKGROUND OF THE INVENTION

1. Technical Field of Invention

The invention disclosed and taught herein relates generally to a system and method of use that may be employed to provide artificial gravity in low or zero gravity environments such as outer space, using centrifugal force within a spacecraft.

2. Description of Related Art

Astronauts experience multiple physiological effects in an environment of low or zero gravity such as spaceflight. In situ equipment designs to combat some of these effects have been made and flown in space. The prior art for combating some physiological symptoms during spaceflight includes items such as treadmills or similar exercise devices where an astronaut is bungee-corded to such a device during use. These devices may assist in maintaining muscle strength and mass, cardiac performance, etc., among other potential health benefits. Nevertheless, one negative physiological effect of spaceflight that remains to be successfully addressed is bone mass loss, a process which begins soon after reaching a weightless condition in outer space, which varies both by individual metrics and the duration of weightlessness, and is ameliorated only by individually-varying degrees of recovery upon return to earth where earth-normal gravity (acceleration) is restored. Full recovery of lost bone mass upon returning to earth is not guaranteed, as prior studies on American and Russian astronauts have shown that bone mass loss for some astronauts is still measurable 5 years after completed mission durations ranging from 28-184 days.

Therefore, a need exists for a system and method that may combat the physiological effects of spaceflight in a manner intended to reduce the rate of bone mass loss.

Designs for spacecraft-related, gravity-inducing inventions have been conceptualized in such fictional works as the movie "2001: A Space Odyssey". While appearing to be fully-conceptualized, the embodied ideas are considered incomplete from an engineering perspective. As an example, early in the movie, the fictional "Pan Am Clipper" spacecraft docks with a fictional earth-orbiting, twin-ring-designed space station that rotates at a constant velocity. In a real-life, ring-design space station, as astronauts and supplies are shuttled between a central docking hub and the "ring floors", which provide a gravity environment thru centrifugal acceleration, two first-order dynamic effects must be accommodated: 1) in an absence of other controls, the angular momentum of the entire vehicle will be conserved even while there is addition/subtraction of mass at the fixed rotational radius of the "ring floors". That is, spacecraft rotational speed will increase as astronauts and supplies leave a ring floor, and conversely, rotational speed decreases as astronauts and supplies arrive at a ring floor of such a space station. This conservation of angular momentum produces rotational speed changes as mass locations change, yet this compensatory speed change—the natural physical law "conservation of angular momentum"—is undesirable for maintaining a constant state of acceleration (artificial gravity) at a "ring floor". As a result, "tip thrusters" or similar attitude control gas jets must be utilized at the periphery of the ring structure in order to maintain constant rpm, being oriented tangentially in either "direction of" or "against" vehicle rotation to speed up or decelerate the spacecraft, respectively, to maintain this desired rpm while the spacecraft's angular momentum changes during crew transfers, etc. The magnitude of required rotational speed adjustment is dependent upon and proportional to the ratio of arriving/departing mass relative to the overall mass at the ring floors, as well as the acceptable rotational speed error for the design. 2) Depending on where astronauts and supplies are already located on the ring floor, adding "new" mass—visitors and supplies—at random positions along a ring floor (or conversely removing them) will change the dynamic balance of the overall vehicle, as will the transition of these masses from any central docking hub to a ring floor. Cross-product torques will also be created should one ring's ring-floor mass change differently from its companion ring. Again, the magnitude of required dynamic balance compensation relates to the percent of mass change. In addition to the previously-identified rpm-control thrusters, some form of dynamic balance compensation is required for proper attitude control, e.g. "out of plane" thrusters clustered around aforementioned speed-control thrusters, or similar means. In both cases, minimizing consumption of reaction control gas is a goal for any real-world, ring-design space station. Other "non-gas-generating" devices for spacecraft attitude control such as momentum wheels used for spacecraft 3-axis stabilization have a scalability problem in structures of this size, as the amount of torque they could produce against the inertia of the overall spacecraft makes them undesirable from both a weight (mass) and efficacy perspective as they generate insufficiently small angular accelerations to compensate for imbalance loads in such conceptually large spacecraft. Meanwhile, if consumables such as reaction control gas are not properly managed, the mission profiles for ring-design spacecraft can become restricted to low earth orbit where resupply missions that "re-stock" a spacecraft's attitude control gas supplies are more easily accomplished. Further, in the same movie, the fictional Discovery One spaceship, a Jupiter-bound spacecraft, incorporates a single gravity-ring centrifuge which allows for running exercise on the ring floor as well as 'cryo-sleep' berths for crewmembers in suspended animation, yet no compensating systems for angular momentum changes, reaction torques, or dynamic balance are presented. Similarly, a fan of the Star Trek TV and movie series has identified an idea for a single centrifuge ring to be located within the center disk of the imaginary spaceship USS Enterprise, with no account made for attitude control (reaction torques, dynamic balance, etc.) of that proposed device embodied inside the fictional Enterprise spacecraft.

There is merit in using a centrifuge to simulate a gravity-like environment. For example, ground-based centrifuges are designed to induce radial accelerations that can create many times the acceleration due to gravity via centrifugal force (in a horizontal plane of the centrifuge's rotation) in order to aid in understanding the effects of "high g" (high acceleration) loads on an astronaut's ability to perform necessary mission tasks.

No centrifuge solutions at any fraction or multiple of earth-normal gravity (1-G) for use in space are known at this time, and a need exists for a solution that addresses the unique requirements imposed by applying ground-based radial acceleration design concepts to the inertial (zero-g) environment of outer space.

Moreover, the need exists for a centrifugal rotation system for spacecraft that avoids the problems associated with producing radial accelerations on an entire spacecraft to approximate gravity environments for its occupants, sometimes referred to as "rotisserie mode" in reference to rotating a rigid-body spacecraft (Apollo CSM spacecraft rotated slowly along their centerline axis of symmetry for thermal control on approach to and return from the moon, but not fast enough to generate a significantly-perceived "artificial gravity"). Such "entire spacecraft" centrifugal designs do little to address the fuel consumption problem of constantly adjusting for angular momentum changes as occupants move around or otherwise alter the dynamic balance of the overall rotating system. As habitable interior volumes for envisioned future spacecraft increase, the potential impact to attitude control systems that rely on reaction control gas also becomes apparent. Such an approach has the disadvantage of making a reaction control fuel state (consumables supply) hard to estimate, based on unpredictable crew motions (imbalance load) over extended periods of time, for missions far beyond earth orbit. An additional challenge arises when rotating an entire spacecraft, especially at speeds required for a significant percentage of earth-normal (1-g) gravity: spacecraft-mounted, steerable antennae may be required to "target lock and track" Earth or the nearest communications station in order to maintain constant radio contact as the spacecraft itself rotates. Mission success might now depend on motor component reliability of such a design created to compensate for "whole spacecraft" rotation.

Therefore, a need exists to provide for a spacecraft-internal centrifuge invention for use in a zero-gravity space environment

SUMMARY OF THE INVENTION

The present invention provides for restoring a partial gravity environment to increase crew comfort, if not to also possibly aid long-term health issues. The present invention includes a dedicated enclosure for each astronaut that provides for personal space and privacy. This may prove advantageous over certain present methods of providing privacy that can utilize a large, enclosed, but otherwise undivided space with other astronauts. The benefits of this invention may best apply to long-duration space missions beyond earth orbit, where greater emphasis might be made of astronauts' organizational behaviors and long-term comfort, both aided by this invention, proposed to relieve certain physical and psychological stresses.

An artificial gravity system and method for a spacecraft including a least one pair of rotatable stages wherein each stage is capable of rotating about at least one support structure in the spacecraft and wherein the rotatable stages in each pair of rotatable stages counter-rotate one another, wherein each stage is capable of accommodating a plurality of occupants. The stages may be circular, compactly stowed for launch, and deployable upon crew occupancy. The system may include accelerometers and other sensors for use in dynamic balance equipment that utilizes fluid, fluid pumping systems, and storage tanks to redistribute fluid around each ring to optimize the dynamic balance of each stage. The system may also include stage-mounted and spacecraft-mounted, rotational speed-sensing, laser-tracking devices, inertial measurement equipment capable of detecting overall vehicle attitude control changes including net vehicle angular accelerations in all three coordinate axes that constitute the remainder "error torques" imparted to the overall spacecraft by the operation of the invention that will provide input to the spacecraft master attitude control system, stage drive motors, brake motors, and wheel assemblies, foldable structural stage support arms capable of reducing the radial space of each stage during takeoff.

DESCRIPTION OF THE DRAWINGS

The foregoing and other aspects of the disclosed embodiments will become apparent from the following detailed description and upon reference to the drawings, wherein.

DESCRIPTION OF DISCLOSED EMBODIMENTS

The drawings described above and the written description of specific structures and functions below are presented for illustrative purposes and not to limit the scope of what has been invented or the scope of the appended claims. Nor are the drawings drawn to any particular scale or fabrication standards, or intended to serve as blueprints, manufacturing parts list, or the like. Rather, the drawings and written description are provided to teach any person skilled in the art to make and use the inventions for which patent protection is sought. Those skilled in the art will appreciate that not all features of a commercial embodiment of the inventions are described or shown for the sake of clarity and understanding.

Persons skilled in the art will also appreciate that the development of an actual, real-world commercial embodiment incorporating aspects of the inventions will require numerous implementation-specific decisions to achieve the developer's ultimate goal for the commercial embodiment. Such implementation-specific decisions may include, and are likely not limited to compliance with system-related, business-related, and government-related requirements and other constraints, which may vary by specific implementation, from time to time, and by location. While a developer's efforts might be complex and time-consuming in an absolute sense, such efforts would nevertheless be a routine undertaking for those skilled in the art and having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention or the appended claims.

The twin-stage (or twin-ring) centrifuge device described herein is intended to be integrated into a full-scale, man-rated, inflatable spacecraft. In a most preferred embodiment, a spacecraft could be tailored uniquely for this invention. It could be advantageous for a mission integrator to do so, as the axial length that the invention occupies in a preferred embodiment does not occupy more than about 50% of the proposed length of a small man-rated module.

In a preferred embodiment, a tailor-designed spacecraft could be sized specifically to fit the present invention, permitting the re-purposing of the external volume outside of the original-design spacecraft pressure envelope within an original-design launch vehicle payload fairing. This recoverable external volume permits the spacecraft manufacturer to design for additional external stores (propellants, oxygen, etc.) or other space structures or equipment within the same launch vehicle payload volume that a full-sized (original design) spacecraft would otherwise fully occupy.

Once in space, the invention addresses spacecraft inertial (torque) reactions to start-up-, running-, and shut-down-applied torques by means of biased counter-rotational speed control, the absence of which would otherwise severely impact the attitude control system of the host spacecraft utilizing a single centrifuge ring design. That is, the mass of each stage (with or without occupants) in a pair of stages may be accurately sensed in rotation. The stage comprised of lower overall mass can be accelerated proportionally faster in counter-rotation than its more massive companion stage, thereby cancelling each stage's reaction torque to the lowest net error torque feasible. This angular "momentum bias" feature aids to minimize use of required consumable reaction-control gas, a clear advantage for this invention for missions beyond earth orbit. Presently the Genesis 1 and 2 spacecraft manufactured by Bigelow Aerospace utilize prior-art magnetic torque rods, called torquers, in low-Earth orbit to stabilize vehicle orientation against the Earth's magnetic field. Both of these one-third-scale, non-man-rated spacecraft are designed for "attitude hold" operations, receiving no docking spacecraft for their mission durations, and having no astronauts aboard who would change spacecraft attitude as they would move about either vehicle. This form of attitude control may not be an optimal choice for a man-rated system, especially on long-duration missions envisioned outside of earth orbit where no magnetic field is available to stabilize the combined spacecrafts (Bigelow inflatable habitat plus a visiting man-rated space vehicle). In such situations, reaction control gas systems and/or attitude control gyros are envisioned as preferable, but still favor operations requiring as little control input as possible to ensure reaction control fuel budgets and thereby mission success. Both types of attitude control devices represent a considerable mass budget for a mission, and reaction control ("rc") gas is one consumable not readily replaced depending on mission profile, so reducing or possibly eliminating unwanted vehicle torques by design in this invention is advantageous for optimal reaction control fuel system management.

The present invention preferably utilizes two circumferential structural frames as two counter-rotating centrifuges, attached using roller tracks or similar bearing surfaces to the central core of the spacecraft at multiple points for each stage. In a more preferred embodiment, this creates twin "donut-shaped structures" that carry braking motor drives, speed sensing, communication and battery charging equipment. Chairs or other crew-rest devices are also incorporated so that occupants can relax under a rotational acceleration field of some partial or perhaps full 1-G environment. This arrangement is advantageous because it makes good use of the considerably empty interior volume of the spacecraft design.

In a preferred embodiment, a toroidal, ring-like structure can accommodate a plurality of astronauts, wherein each astronaut has a private cabin or similar cubicle enclosure, perhaps modeled after existing stadium-style hotel pods.

The present invention offers a gravity-inducing crew rest device with two circular stages that fits inside a man-rated spacecraft. In the embodiment, the device must counter-rotate at least two circular stages with a preferable maximum occupancy of about three astronauts per stage for a total of about six occupants per paired-stage installation. Those skilled in the art will recognize that this configuration may be expanded into additional pairs of circular stages and that any number of astronauts may be accommodated, depending on the size and capability of the enclosing spacecraft.

Each stage preferably features on-board dynamic balance to account for differing astronaut masses, crew belongings, absent occupants, etc., in order to minimize imbalanced loading on the overall space vehicle. Each stage is similarly preferably capable of momentum bias against its companion stage—changing rotational speed to account for overall rotational inertia difference between stages. For example, a lower-massed, balanced stage would need to spin faster and also in the opposite direction of a higher-massed and balanced stage rotating in the other direction in order to minimize or possibly eliminate net torque on the spacecraft. This feature aids to produce as close to null spacecraft torque as possible, which is sensed by spacecraft-mounted accelerometers/gyros as a mean (net) torque to the spacecraft, whereas individual stage imbalance is sensed by the spacecraft as an oscillating or periodic torque of constantly rotating vector orientation.

Additionally, on-stage regenerative motor braking is envisioned for each stage's deceleration. Electrical power recovered from deceleration is not returned to spacecraft bus power, but instead is stored locally for future stage operations such as ventilation, lights, communications equipment, and the like.

In a preferred embodiment, stationary-to-spacecraft speed sensing is accomplished by electronically reading timing marks on each rotatable stage. In a preferred embodiment, the timing marks on each stage are similar in nature to bar code. Similarly, redundant stage-mounted sensors may read similar timing marks on fixed spacecraft structures, communicating and comparing readings via wireless controls with primary motor controller functions mounted to the spacecraft. If either on-stage speed sensor detects fault outside of allowable ranges with the primary motor control loop (such as motors controlled with both motor-mounted encoders as well as spacecraft-mounted sensors), which can happen during overall spacecraft power failure, it is preferable that on-board, stage-mounted, piston-actuated motor-braking for both stages is envisioned to be commanded as an emergency brake safety device for both rotatable stages. In this case, centrifuge occupants may exit the invention safely and quickly to investigate device or spacecraft faults. Unexpected electrical faults can precede even more dangerous spacecraft conditions, and therefore this subassembly may become a mission-critical safety device as well.

Figure 1:
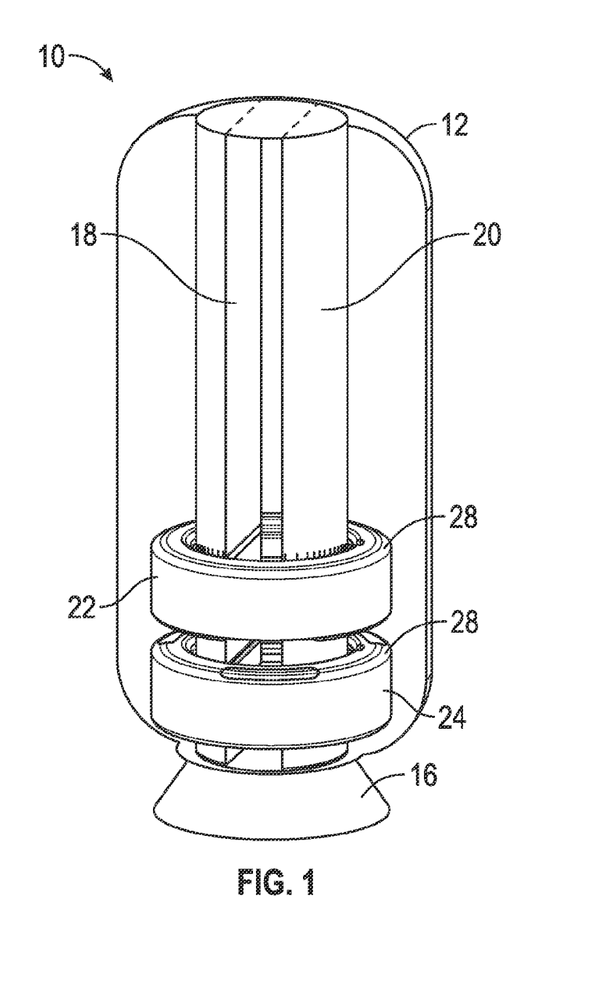
FIG. 1 is cross sectional plan view of a representative spacecraft with invention shown stowed for launch.

FIG. 1 shows a spacecraft 10. In this configuration, the spacecraft 10 is shown with a docking structure or launch adapter cone 16. Support columns 18 and 20 are disposed in the spacecraft 10. Additionally, invention stages 22 and 24 are shown in a stowed (pre-deployment) condition. The diameter of both stages must fit inside the inflatable envelope 12 ("soft goods") for the spacecraft 10. Those skilled in the art will recognize that spacecraft soft goods 12 as shown have been inflated, but would not be inflated before orbit. In a ready-to-launch configuration, the spacecraft 10 would have stages 22 and 24 stowed as shown, where flexible materials and fabrics as well as stowable structures 28 on each stage have been compacted for occupying a minimum radius within the "to be compacted for launch" inflatable spacecraft envelope 12. In orbit, spacecraft soft goods 12 are released from any bindings, including methods such as pyrotechnically-released launch straps, and inflated as shown in FIG. 1. Only then can each stage's flexible materials and fabrics, as well as stowable structures 28 be deployed for crew usage.

Figure 2:
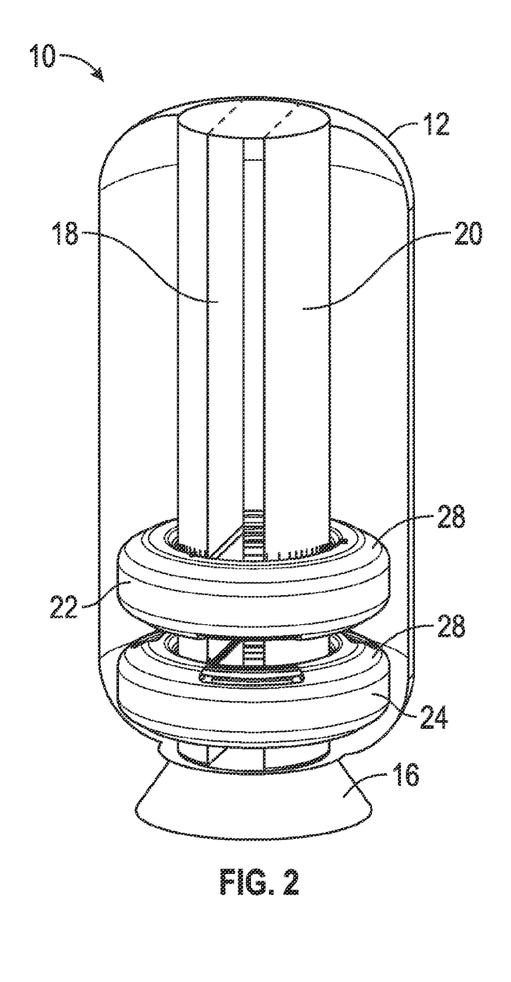
FIG. 2 is cross sectional plan view of a representative spacecraft with invention shown deployed for crew occupancy.

FIG. 2 also shows the spacecraft 10. In this configuration, the spacecraft 10 is shown with a docking structure or launch adapter cone 16. Support columns 18 and 20 are disposed in the spacecraft 10. However, this figure depicts the spacecraft after launch, where the flexible materials and fabrics, as well as stowable structures 28 of stages 22 and 24 are shown in a deployed ("ready for use") condition.

Figure 3:
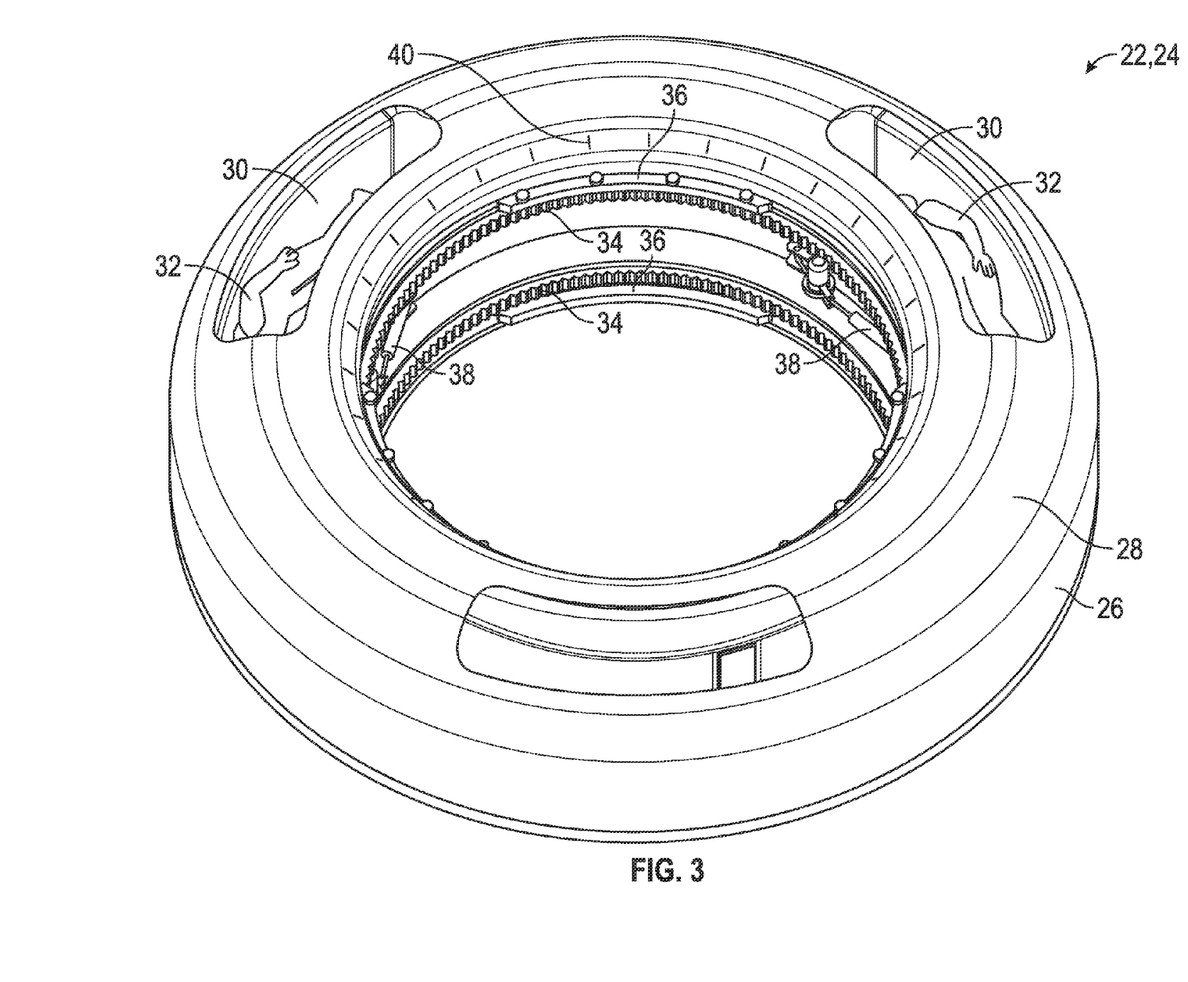
FIG. 3 is perspective view of a rotatable stage that may be used in a representative spacecraft.

FIG. 3 shows a representative stage 22 or 24 (each mechanically identical to the other, mounted inverted with respect to each other so that crew-access openings face each other). Flexible materials and fabrics, as well as stowable structures 28 are mostly hidden but are deployed and include the shown covering 26 for stages 22 and 24. The covering 26 material is preferably a lightweight tension fabric or a multi-piece design of polymer composite construction. Those skilled in the art will recognize that privacy doors can be affixed to the openings in the covering 26, but have been removed from this view for clarity. This view shows an example of inflatable bedding 30 with a representative occupant 32 shown in two of three proposed equally-spaced locations per stage 22/24

Also in FIG. 3, the drive gear assembly 34 is shown with bearing trucks 36 on either side of the drive gear assembly 34. In a preferred embodiment, there will be three pair of bearing trucks 36 per stage 22 and 24. The bearing trucks 36 secure each stage 22 and 24 to bearing tracks or races 42 shown in FIG. 8. These bearing trucks 36 also incorporate load cells not shown for balance load sensing, providing inputs to stage-mounted, fluid-balancing equipment and sensors, part of each stage's redundant computer modules 6 shown in FIG. 4. A brake motor and wheel assembly 38, such as a piston-deployed brake motor and wheel assembly or similar device is also shown. Preferably there are three brake motor and wheel assemblies per stage.

Moreover, timing marks 40 are visible in FIG. 3. The timing marks 40 are used by a spacecraft (10)-mounted, speed-sensing laser. It is preferable that the laser is beyond the visual range and is eye safe for the occupants 32.

Figure 4:
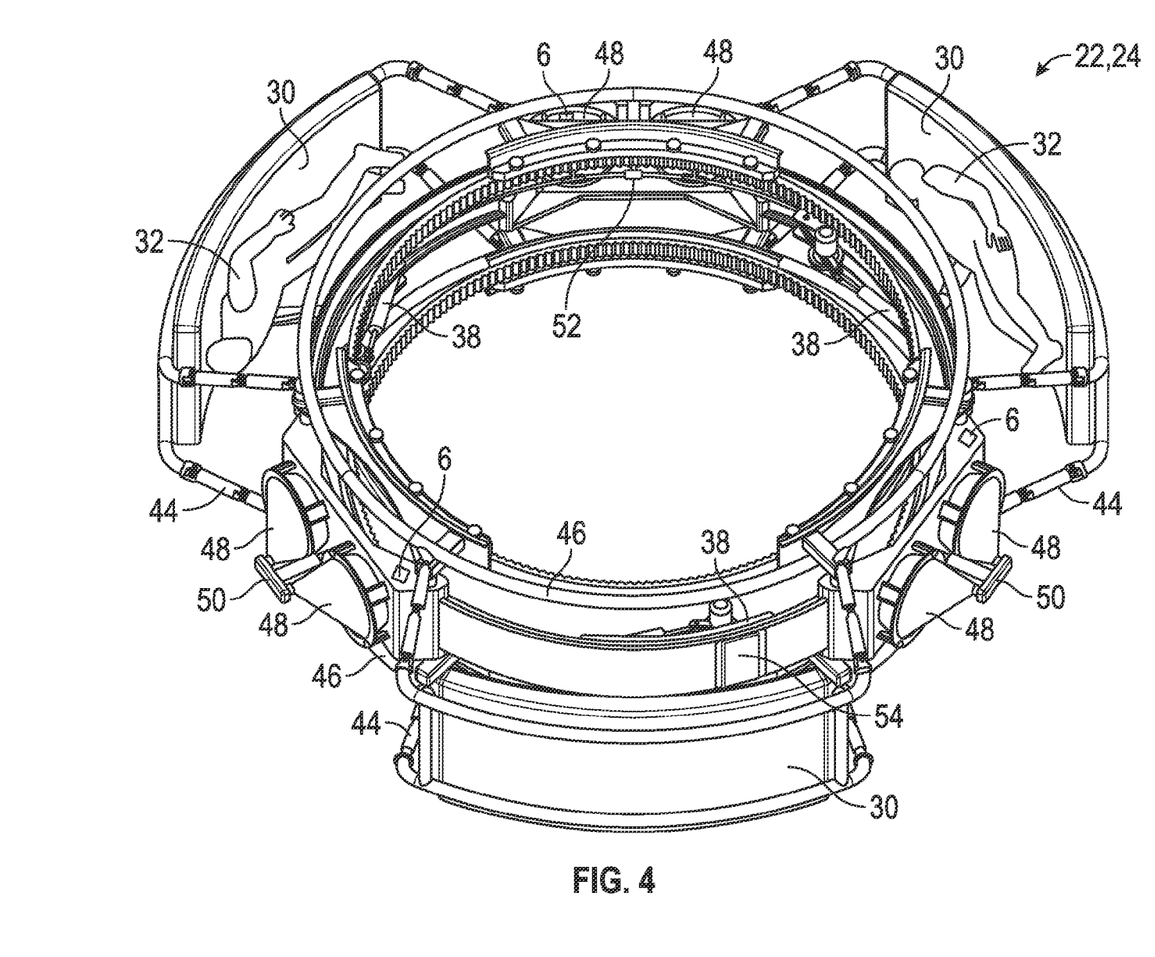
FIG. 4 is a perspective view of a rotatable stage that may be used in a representative spacecraft with the covering of the stage removed.

FIG. 4 shows a representative stage 22 or 24 with the cover 26 not shown. The remaining flexible materials and fabrics, as well as stowable structures 28 are shown in this view. Specifically, articulating rest frames 44, shown deployed and to which inflatable bedding 30 is attached, are further connected to ring frames 46. Representative occupants 32 are shown reclining on inflatable bedding, and each may similarly be articulated to represent a chaise lounge chair, utilizing a sub-frame to tilt the bedding in half so that occupants may rest in a sitting rather than a fully-reclined position. The brake motor and wheel assembly 38 is also shown.

Further shown in FIG. 4 are fluid tank pairs 48. Preferably, there are three fluid tank pairs 48 per stage 22 and 24. For each fluid tank pair 48, one tank contains balance fluid and the other tank is used for reserve volume. The reserve-volume tank is only filled to a level required to accomplish stage dynamic balance. Dynamic balance equipment 50 is shown at the radial end of each tank pair 48, consisting of fluid pumping systems, valves, and pressure transducers for each tank. The tank pairs 48 and the dynamic balance equipment 50 are attached to ring frames 46, which, in turn, attach to the bearing trucks 36 with integral load sensors, also shown in FIG. 4. The reserve-volume tank for each tank pair 48 is shown as the same size as its fluid reservoir tank mate for each tank pair 48. In practice, each reserve volume tank could be double the size of its fluid reservoir mate at each location, so that in a worst-case dynamic-balance situation nearly all fluid volume in a single stage 22 or 24 not contained in redistribution plumbing piping 52 can be located at any one of the three equally-spaced tank pairs 48 if required.

A crew communication and control panel 54 is shown above the inflatable bedding 30 in a position that the occupant 32 of that bedding 30 may access. Those skilled in the art will recognize that it is preferable for each occupant 32 to have access to one of the crew communication and control panels 54, which may contain stage-occupant communications for both stages 22 and 24 as well as overall-spacecraft 10 communications (including docked manned vehicle) and possible video news and entertainment options as well as computer functions for mission experiments or personal (email) use.

Figure 5:
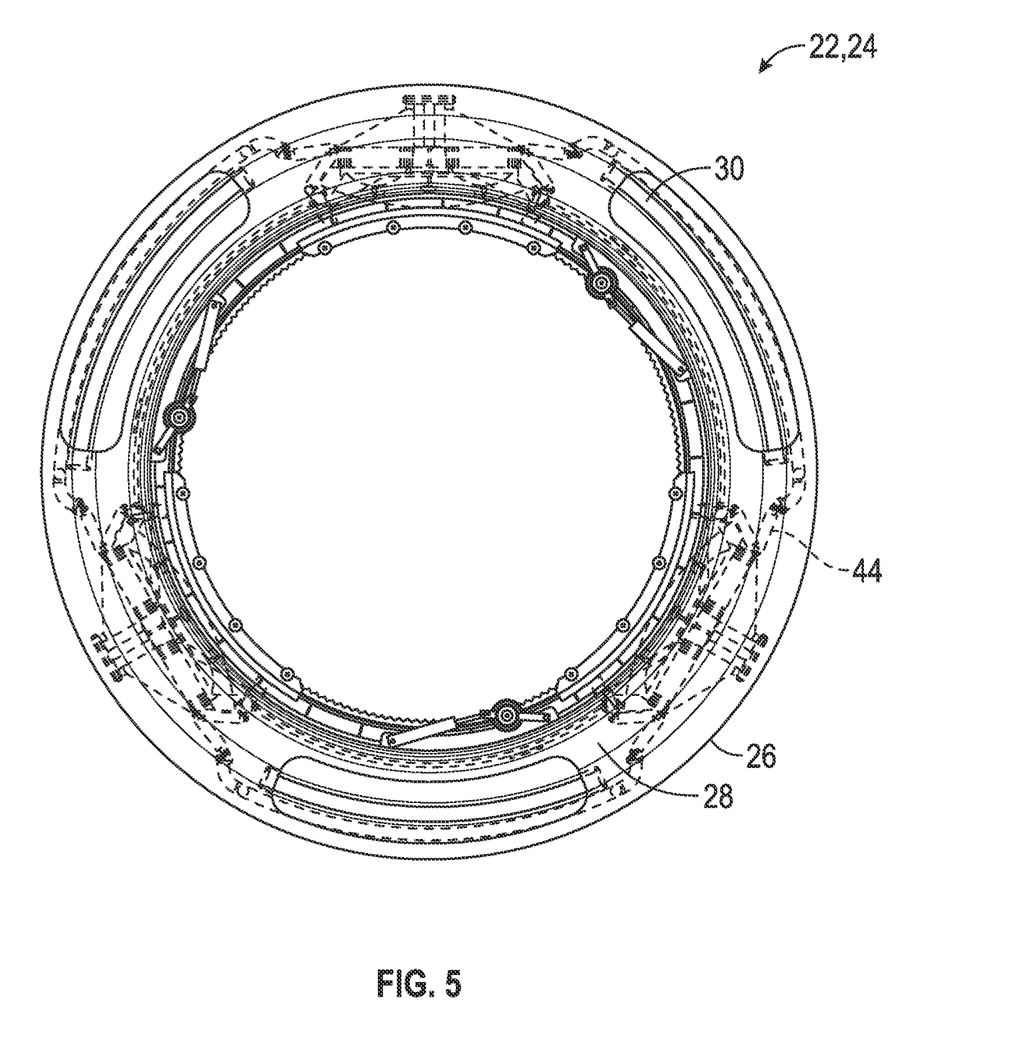
FIG. 5 is an overhead, cross sectional view of a stage that may be used in a representative spacecraft.
Figure 6:
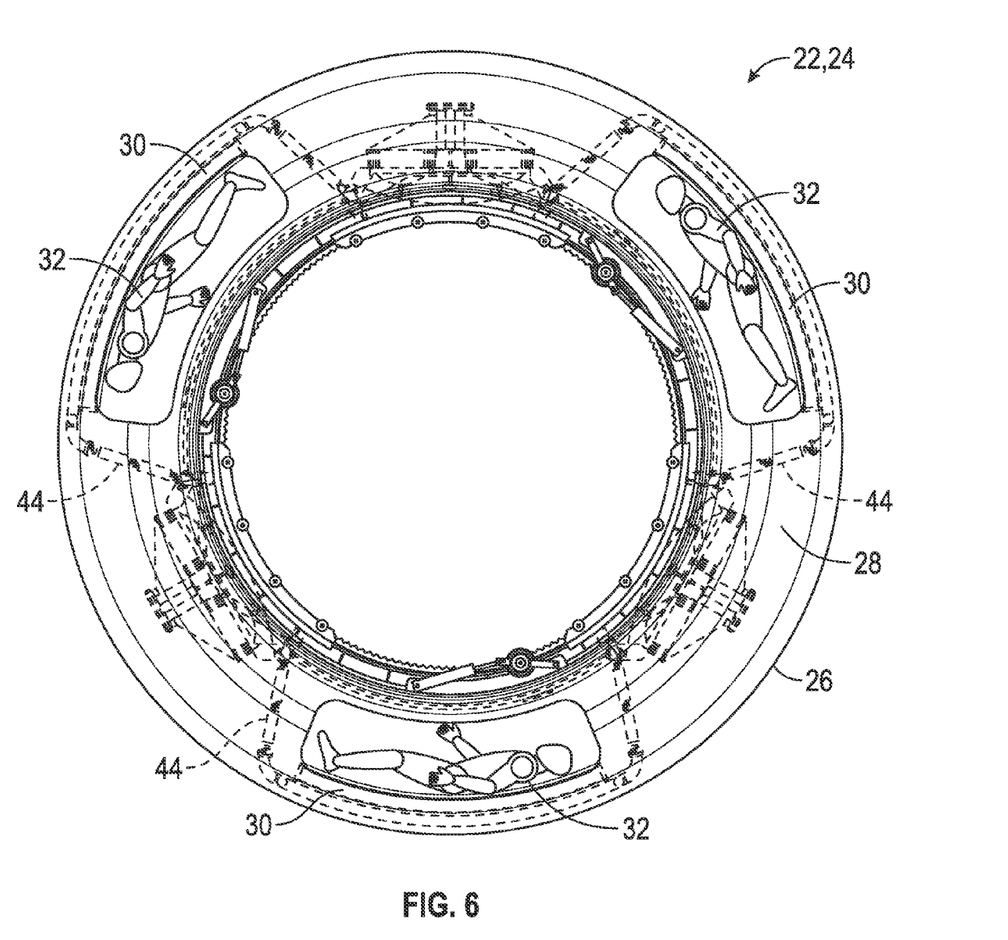
FIG. 6 is an overhead, cross sectional view of a stage that may be used in a representative spacecraft.

As those skilled in the art will recognize, the configuration shown in FIG. 4 represents an on-orbit, deployed view. This distinction is also shown in FIGS. 5 and 6. FIG. 5 shows a plan-view of a stowed-for-launch stage 22 or 24. The inflatable bedding 30 and similar flexible materials and fabrics, as well as stowable structures 28, including the covering 26, are shown stowed, the bedding 30 un-inflated. The structural support arms 44 and covering 26 are folded in a manner which allows for the entire stage 22/24 to take up less radial space within the spacecraft 10 for benefit of the similar compact radial stowing requirement for soft goods 12 at time of launch. In contrast in FIG. 6, the stage 22/24 is shown in a ready-for-use-in-zero-gravity (spaceflight) configuration. The bedding 30 is now inflated, and the structural support arms 44 are shown in their unfolded (deployed) configuration, along with other flexible materials and fabrics 28, including the covering 26.

Figure 7:
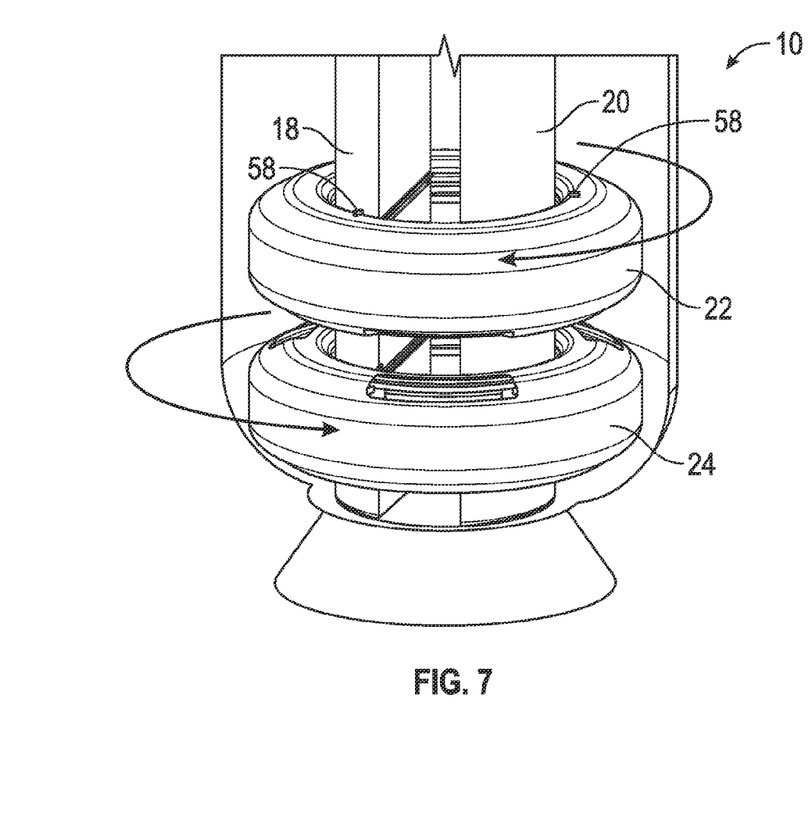
FIG. 7 is a perspective, cross sectional view of a spacecraft with a pair of stages shown during operation.

FIG. 7 shows the stages 22 and 24 in use in zero-gravity. The spacecraft 10 is shown with support columns 18 and 20. From above, stage 22 is shown rotating in a clockwise fashion while stage 24 is shown rotating in a counterclockwise fashion. This counter rotation of related stages is beneficial for the reasons discussed above. A stage-mounted laser tracker 58 for each stage 22 and 24 is capable of reading the timing marks 40 shown in FIGS. 3 and 8. It is preferable to have three stage mounted laser trackers 58 per stage in the preferred embodiment.

Figure 8:
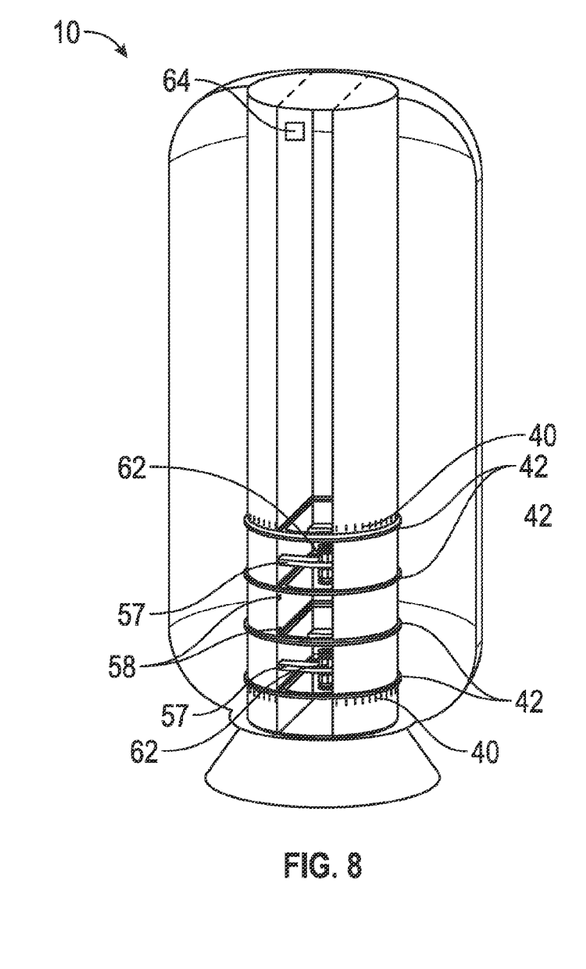
FIG. 8 is a perspective, cross sectional view of a spacecraft with the stages removed to show spacecraft-mounted stage supports.

FIG. 8 shows a spacecraft 10 where both stages 22 and 24 are not shown for clarity. Timing marks 40 are displayed along with pairs of bearing races 42 which guide each stage's bearing trucks 36 not shown. Spacecraft-mounted laser trackers 58 are shown. Wheel tracks 57 are present for each stage-mounted brake motor and wheel assembly 38 not shown. Redundant (paired) drive motor assemblies 62, which can also perform braking operations, are shown. An inertial measurement unit 64, such as a ring-laser gyro or similar device detects the overall vehicle angular accelerations and can send corrective signals to the spacecraft 10 attitude control system including detecting net vehicle rotational acceleration rates in all three coordinate axes and other dynamic imbalances imparted to the enclosing spacecraft.

While the invention has been described with reference to one or more particular embodiments, those skilled in the art will recognize that many changes may be made thereto without departing from the spirit and scope of the description. Each of these embodiments and obvious variations thereof is contemplated as falling within the spirit and scope of the claimed invention, which is set forth in the following claims.

What is claimed is:

1. An artificial gravity system for a spacecraft comprising:
    at least one pair of rotatable stages, wherein the pair of rotatable stages comprise a first stage and a second stage, wherein each stage is capable of rotating about at least one support in the spacecraft;

a plurality of tank pairs within each pair of rotatable stages wherein at least one tank contains a balance fluid which can be redistributed throughout the pair of rotatable stages via a fluid pumping system with at least one tank per tank pair capable of containing a reserve volume for the redistributed fluid; and wherein in each pair of rotatable stages the first stage is capable of rotating clockwise compared to the support and the second stage is capable of rotating counterclockwise compared to the support;

wherein each stage is capable of accommodating a plurality of occupants.

2. The system of claim 1 wherein each stage is circular.

3. The system of claim 1 wherein a portion of each stage can be deployed from a stowed configuration.

4. The system of claim 1 further comprising dynamic balance equipment.

5. The system of claim 1 further comprising both stage- and spacecraft-mounted laser tracking equipment for redundant rotational speed measurement.

6. The system of claim 1 further comprising inertial measurement equipment.

7. The system of claim 1 further comprising a drive assembly and a brake motor and wheel assembly for each stage.

8. The system of claim 1 wherein each stage comprises a plurality of foldable structural support arms capable of reducing a radial space of the stage during takeoff.

9. The system of claim 1 further comprising an inertial measurement unit capable of detecting net vehicle rotational acceleration rates in all three coordinate axes and other dynamic imbalances imparted to the spacecraft.

10. A method of providing artificial gravity in a spacecraft, wherein the spacecraft has a support, which comprises the steps of rotating a pair of stages about the support, wherein the pair of stages comprises a first stage and a second stage, and wherein in each pair the first stage is capable of rotating clockwise compared to the support and the second stage is capable of rotating counterclockwise compared to the support; and redistributing fluid through the pair of rotatable stages via a fluid pumping by using a plurality of tank pairs within each pair of rotatable stages, wherein at least one tank contains a balance fluid and at least one tank per tank pair is capable of containing a reserve volume for the redistributed fluid; and wherein each stage is capable of accommodating a plurality of occupants.

11. The method of claim 10 further comprising the step of reading timing marks on each stage and redundantly reading timing marks on the spacecraft.

12. The method of claim 11 wherein the step of reading timing marks on each stage requires at least one spacecraft-mounted laser-tracker, and the redundant function of reading timing marks on the spacecraft requires at least one stage-mounted laser tracker per stage.

13. The method of claim 10 further comprising the step of actuating at least one stage-mounted regenerative braking motor for each stage.

14. The method of claim 10 further comprising the step of sending corrective signals to an attitude control system.

15. The method of claim 10 which further comprises the step of unfolding a plurality of structural support arms within each stage upon crew occupancy during spaceflight.

* * * * *